May 20, 1941.  V. W. GIDEON  2,242,781
GRINDING MACHINE
Filed Jan. 24, 1940  4 Sheets-Sheet 3
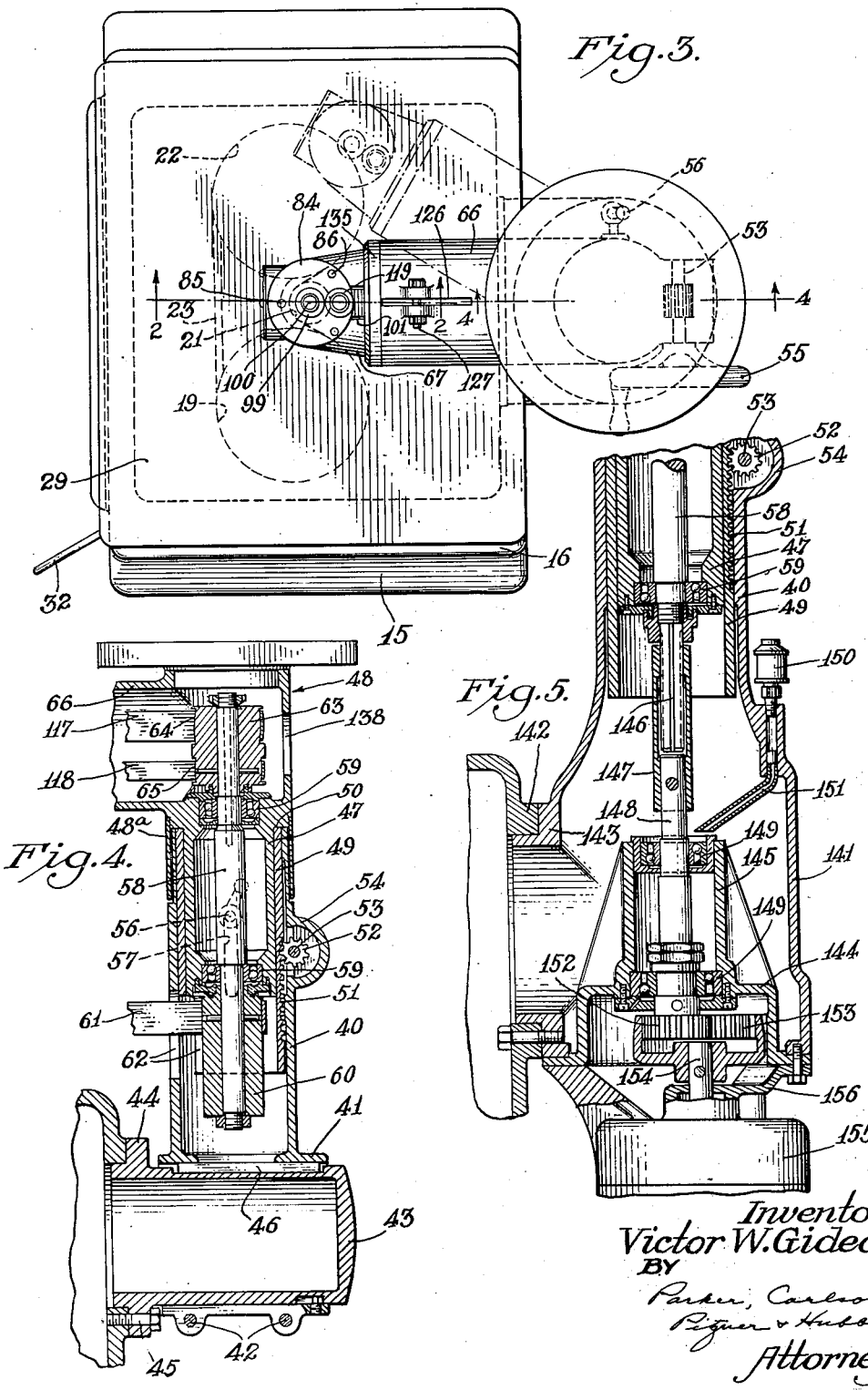
Inventor
Victor W. Gideon
BY
Parker, Carlson,
Pitzner & Hubbard
Attorneys.

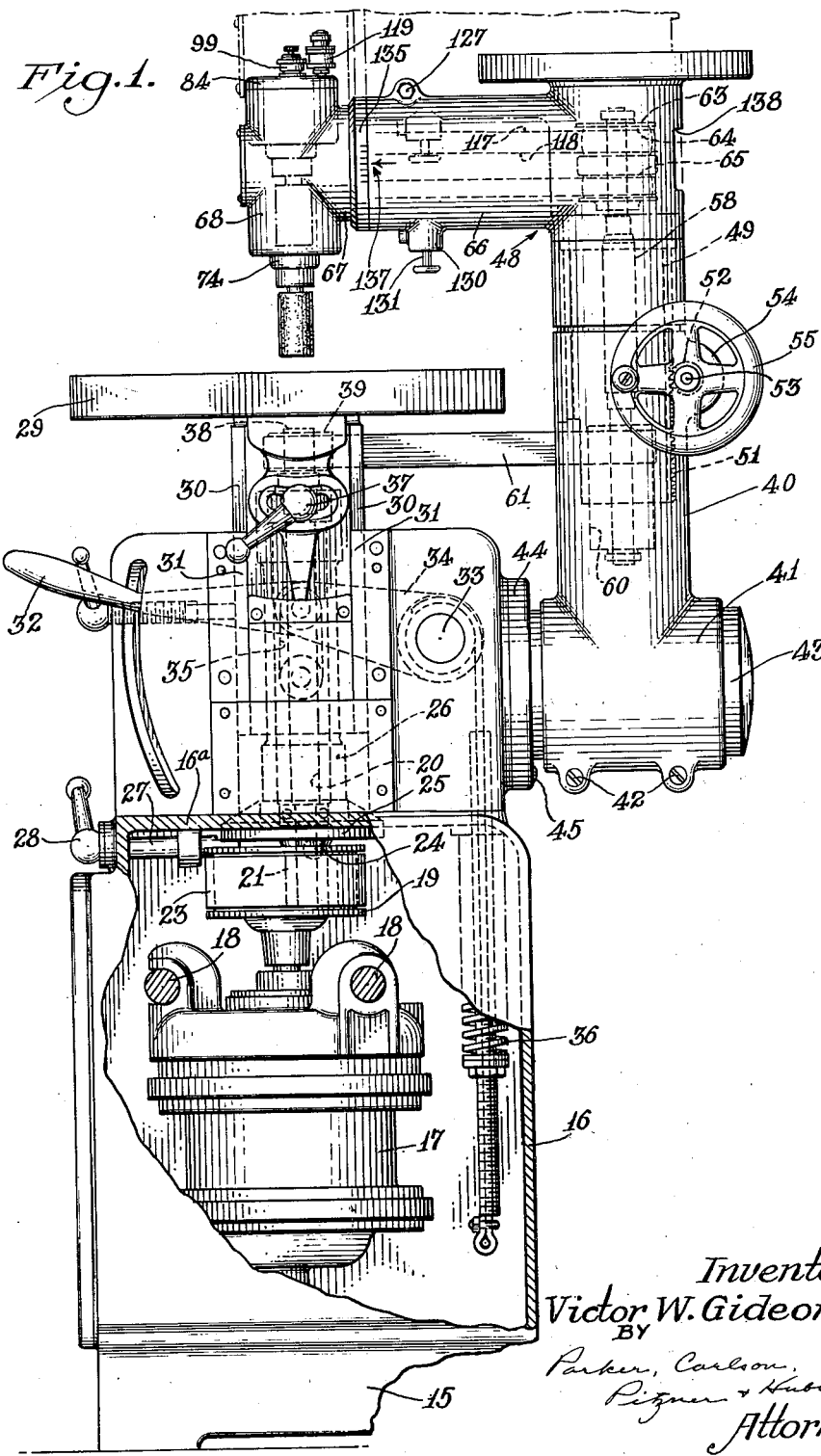

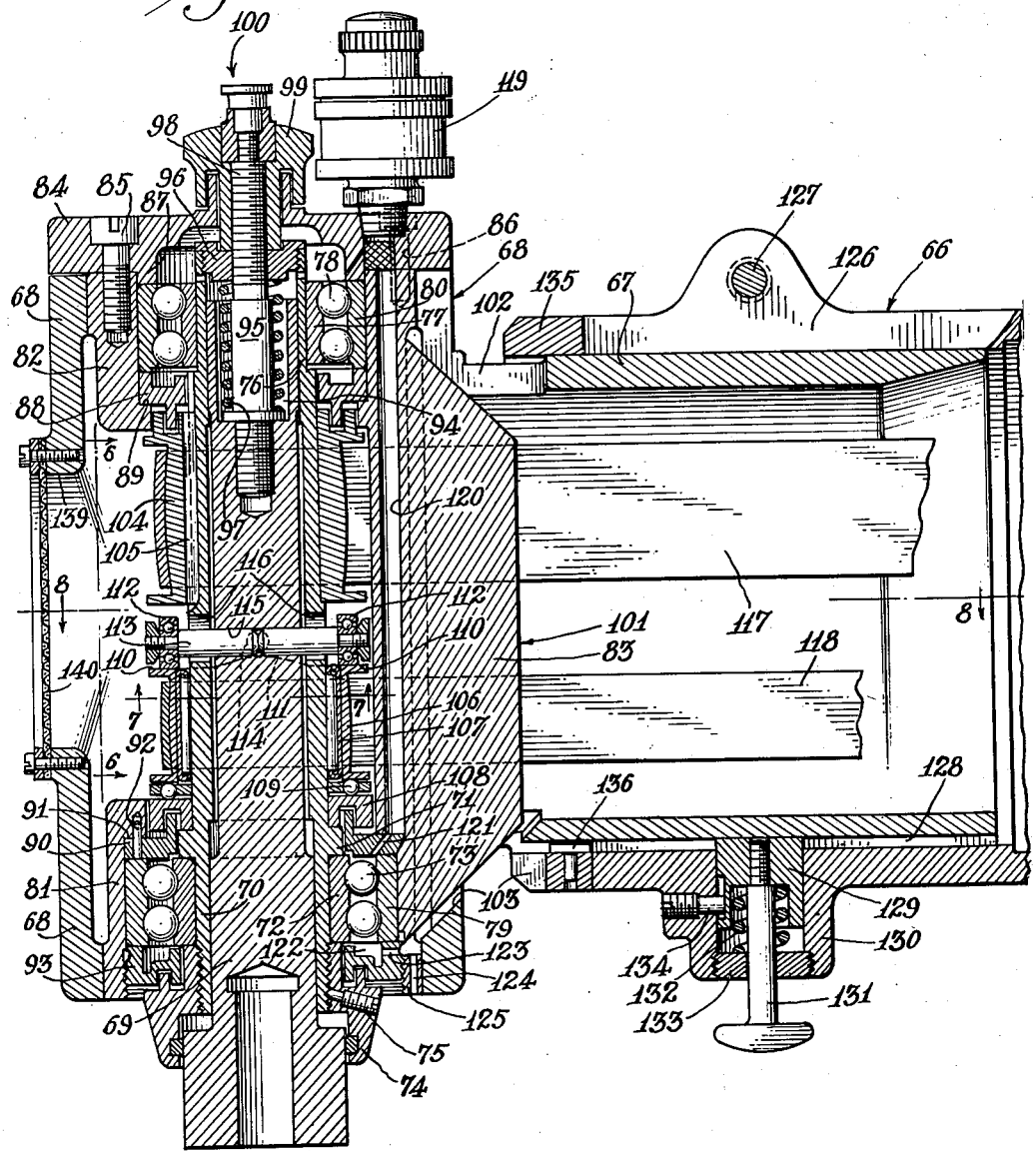

May 20, 1941. V. W. GIDEON 2,242,781
GRINDING MACHINE
Filed Jan. 24, 1940 4 Sheets-Sheet 4

Inventor
Victor W. Gideon
BY
Parker, Carlson,
Pitzner & Hubbard
Attorneys.

Patented May 20, 1941

2,242,781

UNITED STATES PATENT OFFICE 2,242,781

GRINDING MACHINE

Victor W. Gideon, Chicago, Ill., assignor to Boyar-Schultz Corporation, Chicago, Ill., a corporation of Illinois Application January 24, 1940, Serial No. 315,366

3 Claims. (Cl. 51—34)

The invention relates to grinding machines and more particularly to machines of this nature which embody a tool spindle having high rotational velocity and comparatively slow axial reciprocation.

An object of the invention is to provide in such a machine novel and effective means for deriving high speed rotary and slow axial reciprocatory spindle movements from a common source of power.

Another object is to provide a new and improved spindle assembly for a grinding machine which embodies means for axially reciprocating the spindle including cooperating cam members and a common means for driving one of the cooperating cam members at spindle speed and the other cooperating cam member at a predetermined speed other than spindle speed.

Another object is to provide in a grinding machine a novel over-arm assembly in which an axially reciprocatory, vertically disposed, grinding element spindle is supported for angular, radial or straight line adjustments and is arranged to be driven and reciprocated by a source of power that may, as desired, be a part of the assembly or the driving means of another tool.

Another object is to provide a novel over-arm assembly of the character above set forth which is adapted for operative association, either as an attachment to or as an integral part of, a grinding machine having a vertical spindle supporting a grinding element at its upper end.

Other objects and advantages will become apparent in the following description and from the accompanying drawings, in which:

Figure 1 shows in front elevation the operative structure of a grinding machine embodying the features of the invention.

Fig. 2 is an axial sectional view taken axially of the spindle on the over-arm assembly as indicated by the line 2—2 of Fig. 3.

Fig. 3 is a plan view of the grinding machine as shown in Fig. 1.

Fig. 4 is a sectional view taken axially of the drive shaft of the over-arm assembly as indicated by the line 4—4 of Fig. 3.

Fig. 5 is a similar view showing the construction as modified to include the prime mover as a part of the over-arm assembly.

Figure 6:
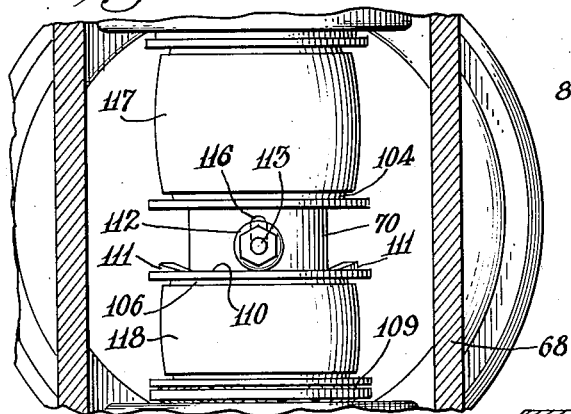
Fig. 6 is a view of a detail of the over-arm spindle looking in the direction indicated by the line 6—6 in Fig. 2.
Figure 7:
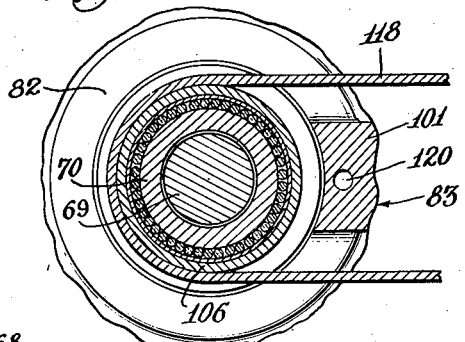
Fig. 7 is a sectional view through the over-arm spindle taken along the line 7—7 of Fig. 2.

While the invention is susceptible of various modifications and alternative constructions, I have shown in the drawings and will herein describe in detail the preferred embodiments, but it is to be understood that I do not thereby intend to limit the invention to the specific form disclosed, but intend to cover all modifications and alternative constructions falling within the spirit and scope of the invention as expressed in the appended claims.

In the following discussion of the present invention, it will be considered in its association with a grinding machine which has a vertically disposed driven spindle arranged to carry a grinding element or the like at its upper end for operation on a superimposed work piece such as a die, or the like, mounted on a work supporting table. The over-arm assembly may, as will hereinafter more clearly appear, be a permanent part of the machine structure, or, since it is substantially a unitary assembly, it may be arranged for attachment to an existing machine.

Since the exemplary form of the grinding machine on which, as shown in Fig. 1, the over-arm assembly is mounted is but illustrative of a suitable supporting means for the over-arm assembly and source of power for the assembly spindle, the structural details of the machine will be only briefly described. Thus, the grinding machine embodies an upright pedestal 15 having a hollow upper portion 16 traversed by an intermediate wall 16ª. Below the wall a driving motor 17 is supported for transverse adjustment by rods 18. The armature axis of the motor is vertically disposed and carries a pulley 19 below and adjacent to the wall. A spindle 20 is journaled in the top of the upper portion 16 and carries a pulley 21 at its lower end beneath the wall.

An idler pulley 22 (Fig. 3) is disposed in the plane of the pulleys 19 and 21. A belt 23 passes about the pulleys 19 and 22 and one run passes across the spindle pulley 21 to drive the spindle 20 at a comparatively high rate of speed. The idler pulley assembly includes an antifriction roller 24 (Fig. 1) having motion through a circular path derived, through a worm and worm wheel connection (not shown), from the idler pulley 22, and this antifriction element coacts with a plate 25 to impart vertical reciprocatory motion thereto. The plate is a part of a spindle supporting sleeve assembly 26 which is relatively rotatable to and axially movable with the spindle. Hence, the vertical reciprocation of the plate 25 imparts similar motion to the spindle. The plate may be shifted out of vertical engagement with the antifriction element 24 by means of an eccentric finger engageable with the plate 25 by manipulation of a shaft 27 having an operating lever 28. This arrangement serves as a clutch for controlling axial reciprocation of the spindle independently of spindle rotation.

A work table 29 is supported above the pedestal by transversely spaced slides 30 mounted in ways 31 on the sides of the pedestal. Movement of the table upwardly and downwardly is manually controlled by such means as a hand lever 32 acting through a rock shaft 33 and links 34, 35 to move the slides 30 vertically. A spring counterbalance 36 acts on the rock shaft to urge the table toward its elevated position. Arcuate ways extending transversely of the slides support the table and permit it to be fixed by a locking device 37 in a horizontal or tilted position.

The upper end 38 of the spindle 20 is normally located beneath the table 29 and is adapted interchangeably to receive a tool chuck or a driving pulley, the latter being herein illustrated and designated 39. When such a tool as a grinding element is secured to the spindle, the machine is adapted for operation on a work piece supported by the table. Replacement of the tool chuck by the pulley 39, and disengagement of the means for vertically reciprocating the spindle, converts the machine to a driving means or prime mover for the spindle of the over-arm assembly.

In a preferred form, the over-arm assembly includes a vertical tubular standard 40 having at its lower end a split sleeve 41 disposed on a horizontal axis and provided with clamping screws 42. A cylindrical stud 43 fitting snugly in the sleeve projects horizontally from a plate 44 which is adapted to be secured in any suitable manner to a selected supporting means. In this instance, the plate 44 is secured by screws 45 to the rear side of the upper portion 16 of the pedestal. The sleeve is preferably keyed, as at 46, to the stud 43 for axial but non-rotative adjustment.

The upper end of the standard 40 is open to receive the depending cylindrical arm 47 of an L-shaped casing 48 (Fig. 4). The external diameter of the arm 47 is less than the internal diameter of the standard 40 and a sleeve 49 is interposed in the clearance therebetween with its upper end in abutment with a shoulder 50 on the casing. Vertical adjustment of the casing 48 is, in this instance, effected by vertical movement of the interposed sleeve. Thus, the sleeve has an external longitudinally extending rack 51 formed thereon or secured thereto for engagement by a pinion 52 on a shaft 53 journaled at opposite ends on a semicylindrical projection 54 on the standard 40. The shaft 53 carries a hand wheel 55. The casing 48, through the arm 47, is rotatably adjustable with respect to the standard 40 and sleeve 49 and its position may be suitably fixed as by a set screw device 56 (Fig. 3) mounted on the standard 40 and extending through a slot 57 (Fig. 4) in the sleeve 49 into binding engagement with the external surface of the arm 47. The set screw device also maintains the casing in its position of vertical adjustment. If desired, a skirt 48a may be secured to the casing 48 in encircling relation to the upper end of the standard 40.

A drive shaft 58 for the over-arm spindle extends vertically and axially through and beyond the opposite ends of the arm 47 and is rotatably supported by upper and lower roller bearings 59. The lower end of the shaft 58 has an elongated pulley 60 fixed thereto and a belt 61 running about the pulley 60 and the pulley 39 (Fig. 1) on the grinding machine constitutes the driving connection between the prime mover and the drive shaft of the over-arm assembly. The standard and the sleeve 49 are cut away, as indicated at 62, to admit the belt 61 to the pulley 60.

The upper end of the shaft 58 extends into the corner space of the L-shaped casing 48 and has secured thereto a pulley 63 having upper and lower belt-receiving grooves 64 and 65 respectively. The pulley is substantially centrally disposed with respect to the cylindrical horizontal arm 66 of the casing 48.

The head of the over-arm assembly in which the over-arm spindle is mounted is supported by the horizontal arm 66. With particular reference to Fig. 2, the head includes a housing having an enlarged cylindrical sleeve section 67 adapted to fit snugly within the arm 66 and an integral tubular section 68, the axis of which is perpendicular to the axis of the section 67. The section 68 carries the spindle assembly.

The spindle assembly includes a spindle 69 enclosed within an encircling sleeve 70. Near its lower end the sleeve has an annular flange 71 against the outer face of which the inner race 72 of a ball bearing 73 is seated. A ring 74 having a screw threaded engagement with the end of the sleeve, which is fixed by a set screw 75, binds the inner race against the flange. Near its upper end the sleeve 70 is slightly restricted, as at 76, to receive the inner race 77 of a combined thrust and radial bearing 78. Outer races 79 and 80 of the bearings 73, 78 respectively are seated in end collars 81, 82 formed integrally at the ends of a spindle frame 83.

The frame 83 is adapted to fit snugly within the tubular section 68 of the head housing and is secured therein by an upper cap 84 which is secured, as by screws 85, to the upper collar 82 and by screws 86 to the tubular section 68. Removal of the screws 86 permits the spindle assembly and frame 83 to be withdrawn as a unit from the tubular section 68. The cap has an inwardly directed flange 87 for abutment with the outer side of the bearing race 80 to bind it against an oil sealing plate 88 seated on a shoulder 89 on the upper collar 82. In the lower collar 81, a sealing plate 90 is interposed between the outer race 79 of the bearing 73 and a shoulder 91 on the collar, and such means as a pin 92 prevents relative rotation between the plate and the collar. An oil seal 93 has screw threaded engagement with the collar for engagement with the outer side of the outer race.

The spindle 69 is axially adjustable with respect to the encircling sleeve 70. Thus, the upper end of the spindle has an end bore 94 through which a stem 95 extends into axial screw threaded engagement with the spindle. The upper end of the sleeve is closed by a plug 96 and a spring 97, seated in the spindle bore 94, is compressed between the spindle and the plug. The outer end of the stem extends through the cap and is screw threaded, as at 98, for engagement by an elongated nut 99, the inner end of which seats against the plug 96. Hence, the position of the nut on the stem 95 will determine the axial relationship between the spindle and the encircling sleeve. A set screw device, generally indicated at 100, maintains the relationship between the spindle and sleeve.

Figure 8:
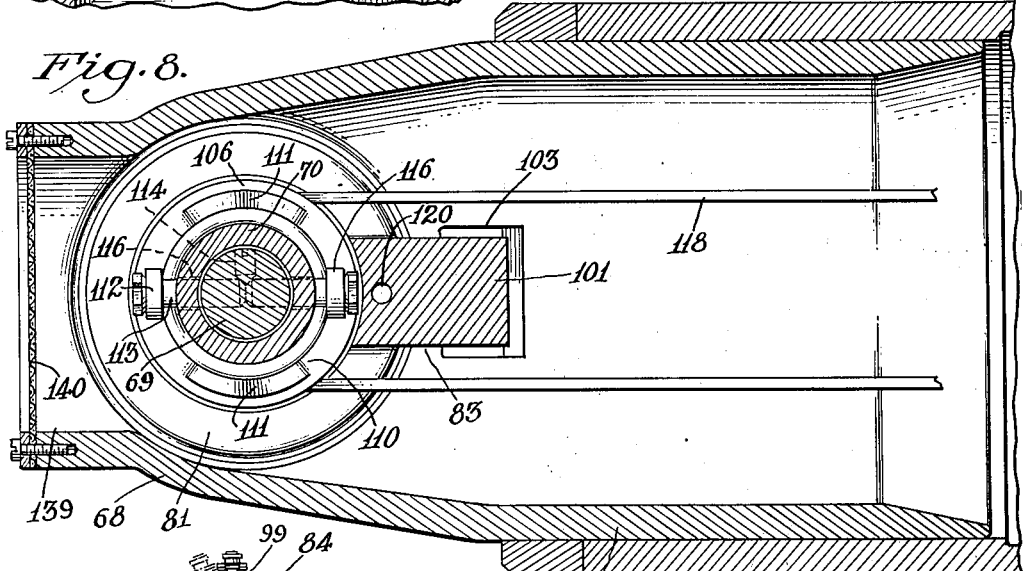
Fig. 8 is a transverse sectional view through the over-arm assembly taken along the line 8—8 of Fig. 2.

The spindle frame 83, as may be seen clearly from Fig. 2, has an enlarged strengthening rib 101 which is elongated in the direction of the spindle axis, is relatively narrow and, as shown in Fig. 8, is of substantial thickness radially. Since the rib, in assembly, extends somewhat into the sleeve section 67, said section and the tubular section 68 at the top of the assembly have a continuing slot 102 providing clearance for the insertion of the spindle support 83 into the tubular section 68. Oppositely located clearance slots 103 are also formed in the lower portions of the head sections.

Adjoining the upper collar 82, the sleeve 70 has a pulley 104 keyed, as at 105, thereto. Spaced between the pulley 104 and the lower collar 81 is a second narrower pulley 106 supported for rotation relative to the sleeve 70 by an assembly 107 of elongated roller elements. A ring 108 on the sleeve 70 is seated against the inner face of the flange 71 and a thrust bearing 109 is interposed between the ring and the adjacent side face of the pulley 106. The opposite side face of the pulley 106 is fashioned to provide a cam surface having, in this instance, diametrically opposed low points 110 and high points 111. The cam is engaged by cam followers herein shown as being antifriction rollers 112 mounted on the opposite ends of a shaft 113 which is held by a set screw 114, or the like, against axial movement in a diametrical bore 115 in the spindle 69. The shaft extends through slots 116 in the sleeve 70, thereby providing the driving connection between the shaft and sleeve, and the slots 116 are elongated in an axial direction to permit the spindle 69 and shaft 113 to reciprocate axially relative thereto as the antifriction rollers follow the cam surfaces 110, 111. The force exerted on the spindle by the spring 97 maintains the antifriction rollers against the cam surfaces.

The pulley 104 is driven by a belt 117 engaging the pulley receiving groove 64 of the pulley 63 on the drive shaft 58. The pulley 106 is driven by a belt 118 engaging the pulley groove 65 in the pulley 63. In the present instance, the pulley grooves 64 and 65 have the same effective diameters so that the belts 117 and 118 are driven at the same rates of speed. The pulleys 104 and 106, however, are of different effective diameters, in this instance the pulley 106 having slightly the larger diameter. As a result, the spindle driving pulley 104 will travel at a slightly faster rate of speed than the pulley 106, causing the cam following roller elements 112 to advance in the direction of rotation over the slower moving cam surfaces 110, 111. The speed differential is predetermined to produce the desired number of axial reciprocations of the spindle with respect to the velocity of spindle rotation and it will be evident that this ratio may be conveniently achieved and maintained by the present construction. While the pulley 106 has been illustrated as being larger than the pulley 104, axial reciprocation would be obtained if it were of smaller diameter. Moreover, the speed differential could be obtained by making the diameters of the pulley grooves 64 and 65 unequal.

Lubrication to the assembly of the lower bearing 73 may be provided by an oil cup 119 mounted on the cap 84 and communicating with the lower bearing through a passageway 120 in the spindle frame 83 and a port 121 in the plate 90. Excess or waste lubrication may drain from the bearing into a receiving groove 122 in the oil seal 93 and thence to exhaust through a port 123 and communicating passages 124 in a fitting 125 on the end collar 81.

Preferably, through the connection between the cylindrical sleeve section 67 of the head housing and the horizontal arm 66 of the supporting standard assembly, the spindle is relatively adjustable longitudinally and rotatably with respect to the axis of the horizontal arm. As shown, the end of the arm is slotted inwardly, as indicated at 126, and a clamping screw 127 is provided to draw the split sleeve into secure clamping engagement with the sleeve section 67. This sleeve section has a longitudinally extending groove 128 releasably engageable by a key 129 seated in a boss 130 on the arm 66. The key is retractable out of engagement with the groove 128 by manipulation of a headed stem 131 against the force of a key-seating spring 132 bearing between the key and a closure 133 for the outer end of the boss. The key 129 is itself keyed, as at 134, against rotative movement relative to the boss.

Figure 9:
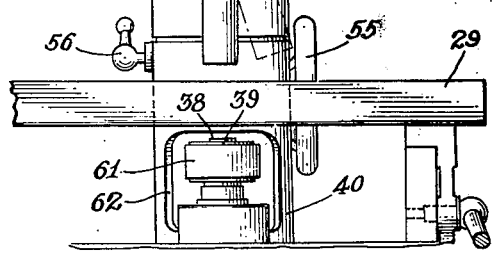
Fig. 9 is a side view of the upper portion of the grinding machine looking from the left-hand side of the machine as shown in Fig. 1.

The relationship between the groove 128 and key 129 preferably determines a zero position of the spindle 69, which position will normally be one in which the spindle axis is vertical. Longitudinal adjustment of the head assembly is obtained by loosening the clamping screw 127 and shifting the head assembly with respect to the supporting arm as desired. For rotational adjustment, the clamping screw is loosened and the key 29 is retracted to permit the head assembly to be rotated about the axis of the supporting arm as shown in dotted outline in Fig. 9. The extent of such adjustment may be conveniently indicated by such means as an indicator ring 135 seated on the cylindrical section 67 adjacent the end of the arm 66 and having a key pin 136 engaging the groove 128. Suitable cooperating indicia 137 (Fig. 1) may be provided on the ring and arm.

If desired, the entire area occupied by the pulleys 104 and 106, belts 117 and 118, and pulley 63 may be ventilated by apertures 138 and 139 in the supporting structures adjoining the pulleys. Preferably, at least the aperture 139 adjacent the spindle pulleys is screened as at 104.

The structure shown in Fig. 5 is a modification of the over-arm assembly in which the drive shaft is driven by a prime mover combined as a unitary part of the over-arm assembly. Fig. 5 is a sectional view through the lower section of the tubular standard 40, and the portions of the assembly which are not illustrated in this figure are constructed in the manner previously described. In the modified form, the lower end of the standard 40 is somewhat enlarged, as indicated at 141, and is adapted to be suitably secured to an appropriate supporting member 142 by such means as a horizontally extending flange 143. Within the enlargement 141 is a transverse wall 144 having an annular offset terminating in a tubular boss 145 substantially coaxial with the drive shaft 58.

The lower end of the drive shaft is vertically splined, as at 146, for engagement with internal splines on a sleeve 147 fixed to the upper end of a stub shaft 148 which is journaled by spaced bearings 149 on the boss 145. An oil cup 150 supplies lubricant through a tube 151 to the bearings. Below the wall 144 the stub shaft 148 carries a gear 152 engaging an internal ring gear 153 rigid with the armature 154 of a driving motor 155. The motor is secured to the lower end of the standard through a bracket 156. The modified construction enables the use of the present invention in environments where no existing prime mover is available as a source of power for the over-arm assembly drive shaft.

From the foregoing, it will be evident that the invention embodies numerous important features and advantages. The connection between the standard 40 and the supporting stud 43 enables the spindle to be initially located in approximately a desired position with respect to the work supporting table. The arrangement of the arm 47 on the head supporting casing 48, with respect to the standard 40, permits the head to be conveniently adjusted vertically with respect to the work and radially about the axis of the standard 40 as a center. The adjustments of the head longitudinally of the axis of the horizontal arm of the supporting casing, as well as radially of said axis, enables the spindle to be precisely disposed for proper engagement with the work. The head assembly for supporting the spindle is comparatively simple and the assembly as a whole is convenient to install. Furthermore, the improved means by which the spindle is driven rotatably and reciprocably at different rates of speed from a common source of power is inexpensive and highly efficient.

I claim as my invention:

1. In a grinding machine of the character described, the combination of a vertical support, means for securing said support to a stationary base part including means for adjusting said support relative to said base part, a member having a section depending into engagement with said support and rotatably adjustable with respect thereto, means for vertically adjusting said member relative to said support, a spindle, a spindle supporting head, means for mounting said head on said member with the axis of said spindle disposed substantially vertically including means for adjustably moving said head toward and away from said support and for rotatably adjusting said head about a horizontal axis, and means for driving said spindle.

2. In a grinding machine of the character described, the combination of a vertical support, means for securing said support to a stationary base part including means for adjusting said support relative to said base part, a member having a section depending into said support, a sleeve interposed between said support and said section for rotatably supporting said member, means for vertically translating said sleeve to adjust said member relative to said support, a spindle, means for mounting said spindle on said member with the axis of said spindle disposed substantially vertically, and means for driving said spindle.

3. In a grinding machine of the character described, the combination of a tubular vertical support, a horizontal member having a tubular section depending into said support and rotatable relative thereto, interposed means for vertically moving said member, a spindle, a spindle supporting head, hollow means for mounting said head on said member, and spindle driving means extending through said support, section and hollow means.

VICTOR W. GIDEON